US008364592B2

(12) United States Patent
Lal et al.

(10) Patent No.: US 8,364,592 B2
(45) Date of Patent: *Jan. 29, 2013

(54) METHOD AND SYSTEM FOR CONDUCTING TRANSACTIONS WITH OLIGOPOLISTIC ENTITIES

(75) Inventors: Raghav Lal, Palo Alto, CA (US); Christopher P. Aguas, Weston, CT (US)

(73) Assignee: Visa U.S.A. Inc., San Francisco, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/755,988

(22) Filed: Apr. 7, 2010

(65) Prior Publication Data

US 2010/0198669 A1 Aug. 5, 2010

Related U.S. Application Data

(63) Continuation of application No. 11/614,747, filed on Dec. 21, 2006, now Pat. No. 7,725,394.

(60) Provisional application No. 60/754,378, filed on Dec. 27, 2005.

(51) Int. Cl.
*G06Q 40/00* (2012.01)

(52) U.S. Cl. ............................................. 705/44; 705/35

(58) Field of Classification Search .................... 705/44, 705/35
See application file for complete search history.

(56) References Cited

U.S. PATENT DOCUMENTS

| | | | |
|---|---|---|---|
| 6,304,860 B1 | 10/2001 | Martin et al. | |
| 6,895,386 B1 | 5/2005 | Bachman et al. | |
| 7,363,249 B1* | 4/2008 | Boesjes ...................... | 705/26.81 |
| 7,725,394 B2 | 5/2010 | Lal et al. | |
| 2002/0087478 A1 | 7/2002 | Hudd et al. | |
| 2002/0184101 A1* | 12/2002 | Gidadhubli et al. ............ | 705/26 |
| 2003/0028469 A1 | 2/2003 | Bergman et al. | |
| 2003/0233327 A1 | 12/2003 | Keresman et al. | |
| 2005/0193893 A1* | 9/2005 | Poston ........................... | 99/342 |

(Continued)

FOREIGN PATENT DOCUMENTS

| | | |
|---|---|---|
| JP | 2002-133530 A | 5/2002 |
| JP | 2002-197382 A | 7/2002 |

(Continued)

OTHER PUBLICATIONS

Bevan, S. (1994). The merchant acquirer's tale. Banking World, 12(4), 19-19. Retrieved Sep. 18, 2012.*

(Continued)

*Primary Examiner* — Kito R Robinson
(74) *Attorney, Agent, or Firm* — Kilpatrick Townsend & Stockton LLP

(57) ABSTRACT

A method for conducting a business transaction using a payment processing network is disclosed. The method includes sending an authorization request message including an authorization request to an issuer, where the authorization request message originates from a business consumer purchasing goods or services from an oligopolistic business entity. The issuer sends an authorization response message indicating that the authorization request is approved or not approved. Economic incentives associated with the business transaction is provided to the oligopolistic business entity or the business consumer for conducting the business transaction, wherein the incentive would not be available in a transaction between a non-oligopolistic business entity and the business consumer. A method for encouraging use of electronic payment methods is also disclosed, wherein an oligopolistic entity and a group of business consumers in an industry vertical are identified based on sales information, and an economic incentive is provided to the oligopolistic business entity after it agrees to accept electronic payment transactions for conducting business with the group of business consumers.

16 Claims, 5 Drawing Sheets

U.S. PATENT DOCUMENTS

2006/0265259 A1\* 11/2006 Diana et al. .................. 705/7
2007/0045407 A1\* 3/2007 Paul et al. .................. 235/380

FOREIGN PATENT DOCUMENTS

| JP | 2002-216058 A | 8/2002 |
|---|---|---|
| WO | WO 2007/075994 | 7/2007 |
| ZA | 200805831 | 11/2009 |

OTHER PUBLICATIONS

Lin, Y. Joseph. (1988). Oligopoly and Vertical Integration: Note. The American Economic Review, 78(1), 251. Retrieved Dec. 4, 2009.

Office action for Mexican Institute of Industrial Property application MX/a/2008/008454 (Mar. 6, 2012).

Office action for Intellectual Property Australia application AU2006331519 (May 25, 2011).

Office action for Intellectual Property Australia application AU2006331519 (Jan. 12, 2012).

Ellickson "Supermarkets as a Natural Oligopoly," Duke University (Sep. 20, 2004).

Chakravorti "A Study of the Interrelated Bilateral Transactions in Credit Card Networks," Emerging Payments Occasional Paper Series (Jul. 2001).

"Chair of Guide for Business: Meaning of Credit and Credit Card Business, No. 2," Cardwave Japan, C-Media, Inc., vol. 13, No. 1, pp. 45-47 (Dec. 10, 1999).

Japan Patent Office office action for patent application JP2008-548646 (Jun. 12, 2012).

International Search Report and Written Opinion corresponding to the PCT application No. PCT/US06/48983, date of mailing Sep. 24, 2007, 7 pages total.

Russian Office Action for Application No. 2008130879/08(038334), dated Dec. 3, 2010, 12 pages total.

Chinese Office Action for Application No. 200680051965.7, dated Feb. 23, 2011, 7 pages total.

Office Action for U.S. Appl. No. 11/614,747, mailed on Jul. 10, 2008.
Office Action for U.S. Appl. No. 11/614,747, mailed on Apr. 2, 2009.
Notice of Allowance for U.S. Appl. No. 11/614,747, mailed on Jan. 8, 2010.

\* cited by examiner ns with oligopolistic business entities. Sales information on the business segment is received. An oligopolistic business entity and a group of business consumers within the business segment are identified based on the sales information. An economic incentive is provided to the oligopolistic business entity after the oligopolistic business entity agrees to use electronic payment transactions for conducting business with the group of business consumers.

METHOD AND SYSTEM FOR CONDUCTING TRANSACTIONS WITH OLIGOPOLISTIC ENTITIES

CROSS-REFERENCE TO RELATED APPLICATIONS

This patent application is a continuation of and claims priority to U.S. patent application Ser. No. 11/614,747 which was filed on Dec. 21, 2006 and which is a patent application that claims the benefit of priority from U.S. Provisional Patent Application No. 60/754,378, filed Dec. 27, 2005, which is incorporated herein by reference it its entirety.

BACKGROUND OF THE INVENTION

While the acceptance of electronic payment transactions, such as credit card, debit card, and electronic settlement transactions, has become nearly universal by businesses that sell goods and services to individual consumers, electronic payment transactions are not yet universally accepted by many businesses that mainly supply goods and services to business consumers, such as restaurants, gas stations, etc. In fact, most of the business transactions between suppliers and business consumers remain invoice based, where the supplier issues an invoice to the business consumer for goods provided or services rendered based on a payment term (e.g., 30 days net) and the business consumer pays the invoice by check.

It is particularly noteworthy that most business consumers purchase their primary supplies (i.e., their primary stock in trade) through invoice based spending. Examples of primary supplies are gasoline for a gas station owner, food products for a restaurant owner, or a stock of CDs for a music store owner. These business transactions of primary supplies between business consumers and suppliers are the source of a tremendous amount of spending, because the average dollar amount for each transaction may be orders of magnitude larger than the average transaction conducted by an individual consumer. Moreover, many of the business consumers operate in business segments where only a few, concentrated suppliers provide a large portion of the primary supplies for business consumers in the segment. It follows that business consumers conversely spend a majority of their primary expenses (i.e., expenses for primary supplies) at a small number of concentrated suppliers operating in those business segments. These concentrated suppliers within a business segment may be referred to as oligopolistic business entities.

Thus far, many of the suppliers and business consumers have shunned the use of electronic payment methods for various reasons. Reasons why business consumers may still rely on the traditional paper-based check payments may include force of habit or perceived simplicity.

Accordingly, it would be desirable to provide improved systems and methods that encourage oligopolistic business entities to accept electronic payment transactions and the business consumers to conduct electronic payment transactions with the oligopolistic business entities.

SUMMARY OF THE INVENTION

Embodiments of the invention are directed to methods and systems for conducting business transactions involving oligopolistic entities.

One embodiment of the invention is directed to a method for conducting a business transaction using a payment processing network. An authorization request message including an authorization request is sent to an issuer. The authorization request message originates from a business consumer purchasing goods or services from an oligopolistic business entity. The oligopolistic business entity is associated with one or more acquirers. An authorization response message is received indicating that the authorization request is approved or not approved. An incentive associated with the business transaction is provided to the oligopolistic business entity or the business consumer for conducting the business transaction, whereby the incentive would not be available in a transaction between a non-oligopolistic business entity and the business consumer.

One embodiment of the invention is directed to a method for conducting a business transaction using a payment processing network. An authorization request message is received. The authorization request message originates from a business consumer purchasing goods or services from an oligopolistic business entity. The oligopolistic business entity is associated with one or more acquirers. An authorization response message is sent indicating that the authorization request is approved or not approved. An incentive associated with the business transaction is provided to the oligopolistic business entity or the business consumer for conducting the business transaction, whereby the incentive would not be available in a transaction between a non-oligopolistic business entity and the business consumer.

Another embodiment of the invention is directed to a computer readable medium that includes code for performing one of the foregoing methods of conducting a business transaction using a payment processing network. Another embodiment of the invention is directed to a point of sale terminal including the computer readable medium. Another embodiment of the invention is directed to a server computer including the computer readable medium.

One embodiment of the invention is directed to a method for identifying oligopolistic business entities within a business segment and encouraging acceptance of electronic payment transactions by the oligopolistic business entities. Sales information on the business segment is received. An oligopolistic business entity and a group of business consumers within the business segment are identified based on the sales information. An economic incentive is provided to the oligopolistic business entity after the oligopolistic business entity agrees to use electronic payment transactions for conducting business with the group of business consumers.

One embodiment of the invention is directed to a payment processing network comprising a server computer comprising a computer readable medium. The computer readable medium comprising code for communicating an authorization request message including an authorization request to an issuer. The authorization request message originates from a business transaction in which a business consumer purchases goods or services from an oligopolistic business entity. The oligopolistic business entity is associated an acquirer. An authorization response message is communicated from the issuer to the acquirer indicating that the authorization request is approved or not approved. An incentive associated with the business transaction is provided to the oligopolistic business entity or the business consumer for conducting the business transaction. The incentive would not be available in a transaction between a non-oligopolistic business entity and the business consumer.

One embodiment of the invention is directed to a system for conducting a business transaction using a payment processing network. The system comprising an oligopolistic business entity associated with an acquirer operatively coupled to the payment processing network and a business consumer associated with an issuer operatively coupled to the payment processing network. The payment processing network comprising a server computer comprising a computer readable medium. The computer readable medium comprising code for communicating an authorization request message including an authorization request to the issuer. The authorization request message originates from a business transaction in which the business consumer purchases goods or services from the oligopolistic business entity. An authorization response message is communicated from the issuer to the acquirer indicating that the authorization request is approved or not approved. An incentive associated with the business transaction is provided to the oligopolistic business entity or the business consumer for conducting the business transaction. The incentive would not be available in a transaction between a non-oligopolistic business entity and the business consumer.

These and other embodiments of the invention are described in further detail below.

DETAILED DESCRIPTION

Figure 1:
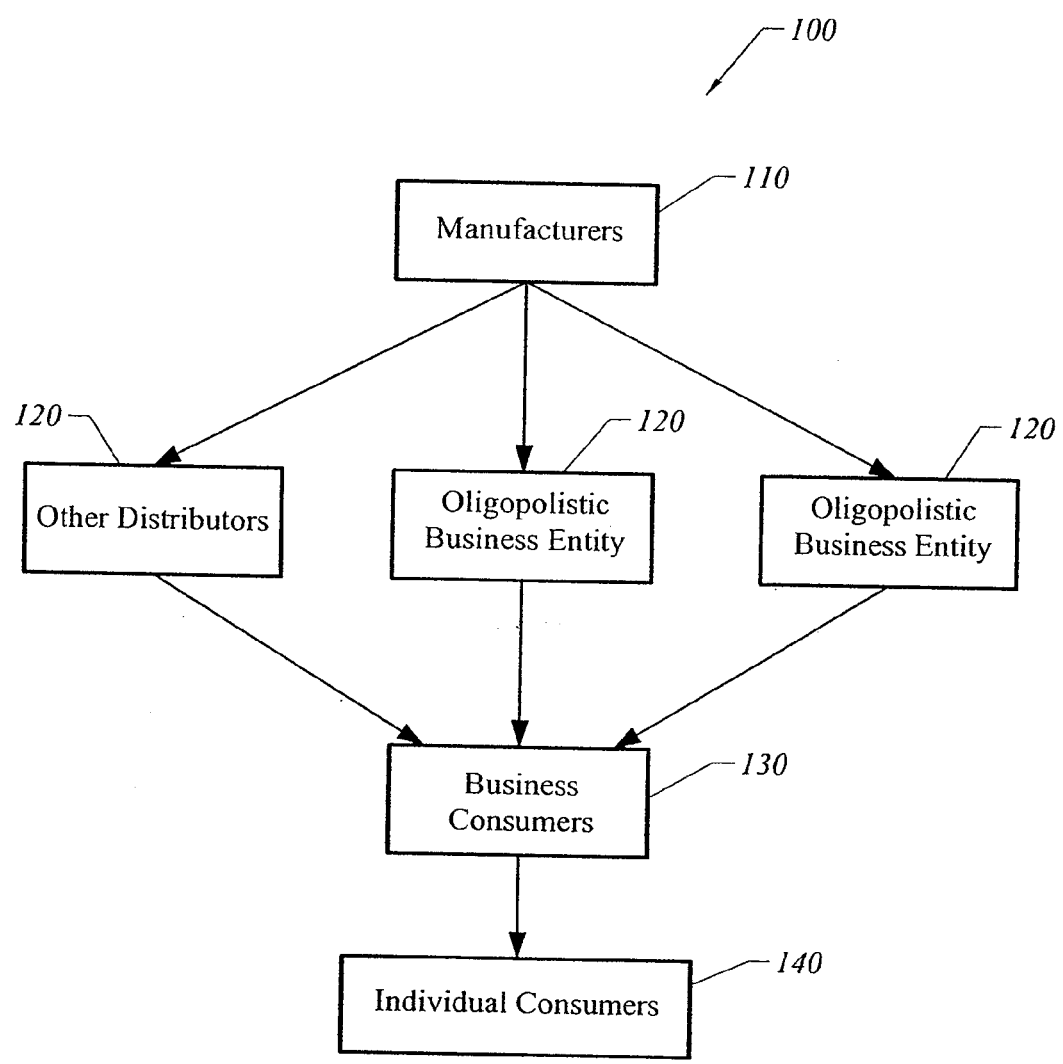
FIG. 1 shows a block diagram of the relationship between manufacturers, distributors including oligopolistic business entities, business consumers, and individual consumers.

Embodiments of the invention are directed to the use of electronic payment transactions (e.g., credit card, debit card, electronic settlement transactions) in commercial transactions between oligopolistic business entities and business consumers. In many business segments, such as the restaurant industry, the gas station industry, the retail industry, and various service industries, there exist vertical supply chains for primary supplies or stock in trade. These vertical supply chains are sometimes referred to as industry "verticals." For example, the restaurant industry embraces a vertical supply chain for food products, the gas station industry embraces a vertical supply chain for gasoline, and the electronics retail industry embraces a vertical for stock electronics equipment. Business consumers within industry verticals are supplied by vertical-specific suppliers that specialize in the good or service of the industry vertical. For example, a vertical-specific supplier provides gasoline to gas stations, but does not sell gasoline directly to the general public.

Many of the vertical supply chains are dominated by a few concentrated vertical-specific suppliers, which collectively dominate the industry vertical and may be referred to as oligopolistic business entities. For example, in the vertical supply chain for gasoline, a large percentage of the gasoline purchased by individual gas stations are sold by a few branded refineries, such as Conoco, Phillips, Texaco, BP, Chevron, etc. Therefore, oligopolistic business entities within a vertical supply chain may collectively account for a large percentage of the total sales to business consumers in the industry vertical and may be relatively few in number. It follows therefore that business consumers within an industry vertical dominated by a relatively few oligopolistic business entities spend a large percentage of their vertical-specific (i.e., primary supply related) expenses at just a few different suppliers.

It should be understood that industry verticals may also be limited by geography or by organizational constraints. For example, the vertical supply chain for concrete may be regional in nature. Therefore, the concrete vertical in the state of California may be defined as a discrete industry vertical having its own group of oligopolistic business entities. Similarly, organizational constraints may also produce a discrete industry vertical within an organization. For example, if McDonald's franchisees are limited to purchasing primary supplies from a pre-authorized group of suppliers, the food product vertical within the McDonald's franchise may be defined as a discrete industry vertical having its own group of oligopolistic business entities.

In one approach, target industry verticals are first identified in which business consumers spend a majority of their primary supply budget at a relatively few number of suppliers. For example, industry verticals are identified where a large percentage (e.g., over ½, over ⅔, over ¾, over 90%) of the business consumers spend over ½ of their primary supply budget (i.e., vertical-specific expenses) at their top 10 vertical-specific suppliers. Once a target industry vertical is identified, oligopolistic business entities within the vertical may be a group of top suppliers in the vertical (as measured by annual dollar amount in sales). For example, the group of top suppliers may be a group of the top 10, five, or three suppliers in the vertical. Alternatively, the group of top suppliers may be a top percentile of suppliers in the vertical (e.g., top 20%, top 10%, top 5%). Other exemplary approaches for defining the group of oligopolistic business entities are set forth below, which may be used in conjunction with the aforementioned method of first identifying a target industry vertical, but may also be used independently thereof.

In another approach, oligopolistic business entities within a particular industry vertical may be defined as a group of the top suppliers in the vertical (as measured by annual dollar amount in sales) that collectively account for over a threshold percentage of the sales to business consumers in the vertical. In one example, the group of top suppliers may account for over 80% of the sales in the vertical. In another example, the group of top suppliers may account for over ⅔ of the sales in the vertical. In another example, the group of top suppliers may account for over ½ of the sales in the vertical. In another example, the group of top suppliers may account for over ⅓ of the sales in the vertical. Therefore, a number of top suppliers make up the group of oligopolistic business entities, which collectively account for over a threshold percentage of the sales to business consumers in the industry vertical.

In another approach, the group of oligopolistic business entities may be defined as no more than a set number of top suppliers that collectively account for the aforementioned threshold percentage of sales in the vertical (e.g., over 80%, ⅔, ½, ⅓). For example, the group may include no more than 10 top suppliers that collectively account for the threshold percentage of sales. In another example, the group may include no more than five top suppliers that collectively account for the threshold percentage of sales. In another example, the group may include no more than three top suppliers that collectively account for the threshold percentage of sales.

In another approach, the group of oligopolistic business entities may be defined as no more than a set percentage of top suppliers, as rounded to the whole number, that collectively account for the aforementioned threshold percentage of sales in the vertical. For example, the group may include the top 20% of the suppliers in the vertical that collectively account for the threshold percentage of sales, as rounded to the whole number. In another example, the group may include the top 10% of suppliers in the vertical that collectively account for the threshold percentage of sales. In another example, the group may include the top 5% of suppliers in the vertical that collectively account for the threshold percentage of sales.

In another approach, the group of oligopolistic business entities is not determined by reference to a threshold percentage of sales in the vertical, and is made up of the top suppliers in the vertical as measured by annual dollar amount in sales. For example, the group may include the top ten, five, or three suppliers in the vertical, or the top 20%, 10%, or 5% of suppliers in the vertical (as rounded to whole numbers).

One illustrative example of a group of oligopolistic business entities within a vertical supply chain is provided with reference to FIG. 1. For the sake of concreteness, the example will refer to a vertical supply chain for fast food products. In particular, vertical supply chain 100 includes manufacturers 110, which in this instance may refer to various agricultural corporations and industrial food producers that cooperate to mass produce fast food products, such as hamburger patties, hamburger buns, french fries, ketchup, soda, and cheese slices. Distributors 120 are suppliers of food products to business consumers 130 in the industry vertical (e.g., fast food restaurants such as Burger King, KFC, McDonald's) and may include major food suppliers such as Sysco, Franchise Foods, McLane, Valley Food Service, Pepsi, U.S. Food Service, etc. Business consumers 130, which may be part of a franchise or trade association, in turn offer their products (e.g., hamburgers, fries, and sodas) to the general public and conduct transactions with individual consumers 140.

If, for example, Sysco and Franchise Foods are the top two suppliers in the vertical as measured by annual sales and collectively (but not individually) account for over 80% of the fast food products sold to fast food restaurants in the vertical, then by one definition, they are the "Oligopolistic Business Entities" in the fast food vertical. Other fast food suppliers would then fall under the label of "Other Distributors," who collectively vie for less than 20% of the market share in the vertical. Of course, it should be understood in view of the foregoing alternative definitions for the group of oligopolistic business entities that there may be many different ways of defining the group oligopolistic business entities in any vertical supply chain.

Figure 2:
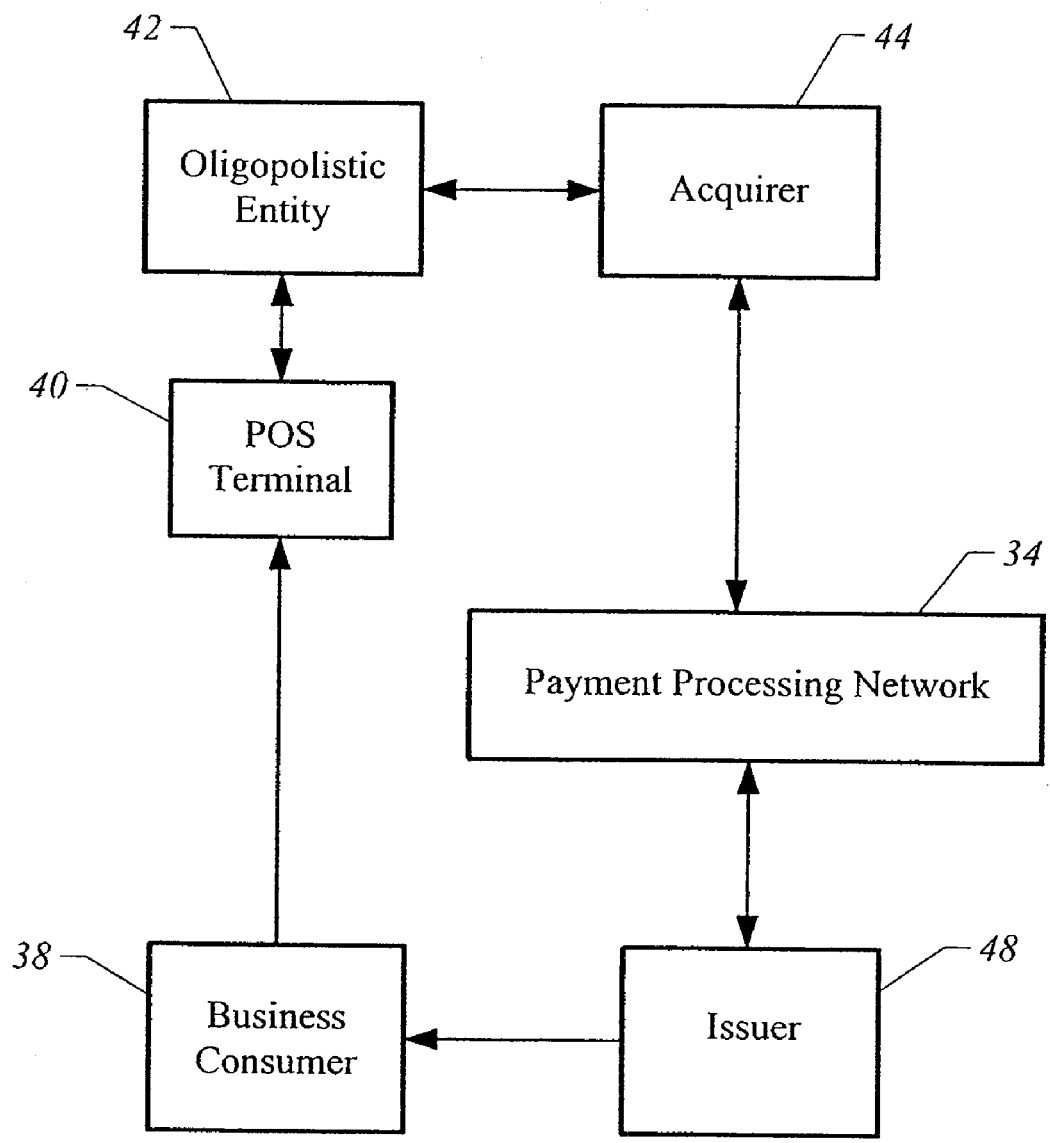
FIG. 2 shows a block diagram of a system including an oligopolistic business entity, an acquirer, a payment processing network, an issuer, and a business consumer.

FIG. 2 shows an exemplary system for processing electronic payment transactions in the context of transactions conducted between an oligopolistic business entity and a business consumer. The system includes a payment processing network 34 (e.g., VisaNet) that allows various entities to communicate with each other. Payment processing network 34 may include one or more server computers that include processors and computer readable media for performing the functions of the network. A business consumer 38 may purchase goods or services from an oligopolistic entity 42 using a POS terminal 40. POS terminal 40 may be any suitable terminal configured to process credit card or debit card transactions, or electronic settlement transactions, and may have optical, electrical, or magnetic readers for reading data from other portable consumer devices such as smart cards, keychain devices, etc. Other examples of portable consumer devices include cellular phones, personal digital assistants (PDAs), pagers, payment cards, security cards, access cards, smart media, transponders, and the like. POS terminal 40 may include a processor and computer readable medium having code for instructing the processor to conduct the transaction. The POS terminal 40 could alternatively be a client computer terminal without a reader for reading data from a portable consumer device such as a payment card. For example, the POS terminal 40 would be a client computer terminal with a display. The business consumer 38 could fill out a form on the display to request authorization for the payment for goods or services provided by the oligopolistic entity 42.

FIG. 2 also shows an acquirer 44 associated with the oligopolistic entity 42, and an issuer 48 associated with the business consumer 38. The acquirer 44 and the issuer 48 communicate via the payment processing network 34 and are therefore operatively coupled to the payment processing network 34. As used herein, an "acquirer" is typically a business entity, e.g., a commercial bank, that has a business relationship with an oligopolistic entity. An "issuer" is typically a business entity (e.g., a bank) which has a business relationship with the business consumer and holds the financial accounts of the business consumer (e.g., holds a credit card account and issues a portable consumer device such as a payment card to the business consumer). Some entities such as American Express perform both issuer and acquirer functions. Embodiments of the invention encompass such single entity issuer-acquirers. Additional details about various elements including issuers, acquirers, portable consumer devices, etc. can be found in U.S. patent application Ser. No. 11/266,766, filed on Nov. 2, 2005, and application Ser. No. 10/020,466, filed on Oct. 29, 2001, which are incorporated herein by reference in its entirety.

Referring to FIG. 2, in embodiments of the invention, an authorization request message is created after a business consumer 38 interacts with an oligopolistic entity 42 and enters into a business transaction to purchase goods or services using a point of sale terminal 40. The business consumer 38 preferably uses a portable consumer device such as a credit card, a debit card, a reloadable card, or a data-access card to pay for the good or service. The authorization request message can be sent from the POS terminal 40 located at the oligopolistic business entity, or in communication with, the oligopolistic entity. The authorization request message is then sent to the oligopolistic entity's acquirer 44, to the payment processing network 34, and then to the business consumer's issuer 48.

As used herein, an "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method, e.g., 128-bit SSL or equivalent-in order to prevent data from being compromised.

Typically, an electronic payment transaction is authorized if the business consumer 38 conducting the transaction has sufficient funds or credit to conduct the transaction. Conversely, if there are insufficient funds or credit in the business consumer's account, or if the business consumer's portable consumer device is on a blacklist (e.g., it is indicated as stolen), then an electronic payment transaction may not be authorized. Similarly, an "authorization response message" stating whether the transaction has been authorized or not authorized is sent, for example, from the issuer to the payment processing network 34, to the acquirer 44, to the oligopolistic business entity 42, and to the POS terminal 40.

If the transaction is approved, a conventional clearing and settlement process may then take place. For example, at the end of the day, the oligopolistic business entity 42 may provide a merchant deposit file to the acquirer 44. The merchant deposit file contains information regarding the current day's electronic transactions. The acquirer 44 may then send an interchange file to the payment processing network 34 along with appropriate interchange codes. Different transactions may be processed for different interchange fees depending on the interchange code. Appropriate interchange codes and transactions details are then forwarded from the payment processing network 34 to the issuer 48. The issuer 48 may then adjust the consumer's account as appropriate and send payment to the acquirer 44.

In a usual transaction, for example, between a business consumer and a non-oligopolistic business entity, a usual interchange fee is used to compensate the issuing bank 48 for the transaction. An "interchange fee" is a fee that is paid by an acquirer to an issuer for transactions that are processed. An "interchange" process is the standardized electronic exchange of financial and non-financial data associated with sale and credit data between merchant acquirers and account issuers. The interchange process typically occurs at the end of the day, after all financial transactions for that day have been completed. It is part of the clearing and settlement part of the payment process, as opposed to the authorization part of the payment process. Interchange processes are described in U.S. patent application Ser. No. 11/266,766, filed on Nov. 2, 2005, which is herein incorporated by reference in its entirety.

Due to the shear volume of business conducted between oligopolistic business entities and business consumers, economic incentives may be offered to induce oligopolistic business entities to accept electronic payment transactions for their sales and for business consumers to use electronic payment transactions for their purchases.

In one approach, when an oligopolistic business entity accepts electronic payment transactions for their transactions with business consumers, it is possible to provide for a transaction fee that is different than the usual interchange fee for transactions occurring between, for example, an individual consumer and a merchant or a business consumer and a non-oligopolistic business entity. If, for example, a usual interchange fee for an individual consumer purchase is 4% of the amount purchased, the transaction fee (also referred to as the preferred interchange fee) may be less than 4% for a transaction between a business consumer and an oligopolistic business entity since the transaction is generally for a larger amount. The preferred interchange fee may be one that is pre-negotiated between the business consumer 38 (and/or its affiliated organization), the oligopolistic entity 42, and an entity (e.g., Visa) that operates the payment processing network 34. Other economic incentives, such as co-promotion of products and services, assistance in new customer acquisition, fraud loss mitigation and credit underwriting, may also be offered instead of or in conjunction with the preferred interchange fee. Thus, by giving an economic incentive (e.g., in the form of a preferred interchange fee) to an oligopolistic business entity for accepting electronic payment transactions, it is more likely that the oligopolistic business entity will accept electronic payment transaction.

In another approach, when a business consumers uses an electronic payment transaction with an oligopolistic business entity, an economic incentive may be offered to the business consumer that is not otherwise available. For example, if a business consumer conducts a credit card transaction with a non-oligopolistic business entity (e.g., an Italian restaurant), no economic incentive is available. However, if a business consumer conducts a credit card transaction with an oligopolistic business entity that supplies gasoline, an economic incentive is offered. Exemplary incentives may be a percentage cash back on the transaction with the oligopolistic business entity, or some other reward or rebate program that only rewards transactions with oligopolistic business entities (e.g., as identified by the account issuer). Other economic incentives, such as co-promotion of products and services, assistance in new customer acquisition, fraud loss mitigation and credit underwriting, may also be offered. Thus, by giving an economic incentive to a business consumer for using electronic payment transactions with oligopolistic business entities, it is more likely that the business consumer will use electronic business transactions to purchase its primary supplies from oligopolistic business entities. Of course, it should be understood that economic incentives may be offered to both the oligopolistic business entity and the business consumer in a transaction to encourage use of electronic payment methods.

In another approach, the use of electronic payment methods (e.g., payment card, portable consumer device, and electronic settlement transactions) can be introduced to a group of business consumers through an organization, such as a franchise or business association, associated with the group of business consumers. For example, the use of electronic payment methods may be introduced to franchisees (McDonald's franchisees) through a business franchisor (e.g., McDonald's corporate headquarters).

In particular, many franchises or business associations have lists of approved suppliers for their franchisees. In one approach, oligopolistic business entities from the list of approved suppliers can be contacted and offered economic incentives when accepting electronic payment transactions. Once the oligopolistic business entities have agreed to accept electronic payment transactions, the franchise or business association may be approached and informed that major suppliers from their list of approved suppliers have agreed to accept electronic payment transactions. Financial accounts, such as payment card based accounts, may then be offered to the franchise or association members that are accepted by the oligopolistic business entities for electronic payment. Economic incentives may also be offered for using the financial accounts in electronic payment transactions conducted with the aforementioned oligopolistic business entities. The financial accounts may also be co-branded by the franchise or business association to promote its use. For example, a Visa card issued by Bank of America may be co-branded by McDonald's for use by all of its franchisees in making purchases from authorized suppliers.

This method is particularly effective as only a small number of oligopolistic business entities and a small number of franchises or business associations in a given business segment need to be contacted to convince them to use electronic payment methods for their business transactions. Because the number of potential parties to be contacted is small, it is practicable to offer economic incentives in transactions involving this small number of potential parties so as to capture a large percentage of the economic activity in the vertical supply chain. And although there is a small number of potential parties, this small number of potential parties can generate a high volume of sales and can make an existing payment card processing system such as VisaNet useful and efficient.

Figure 3:
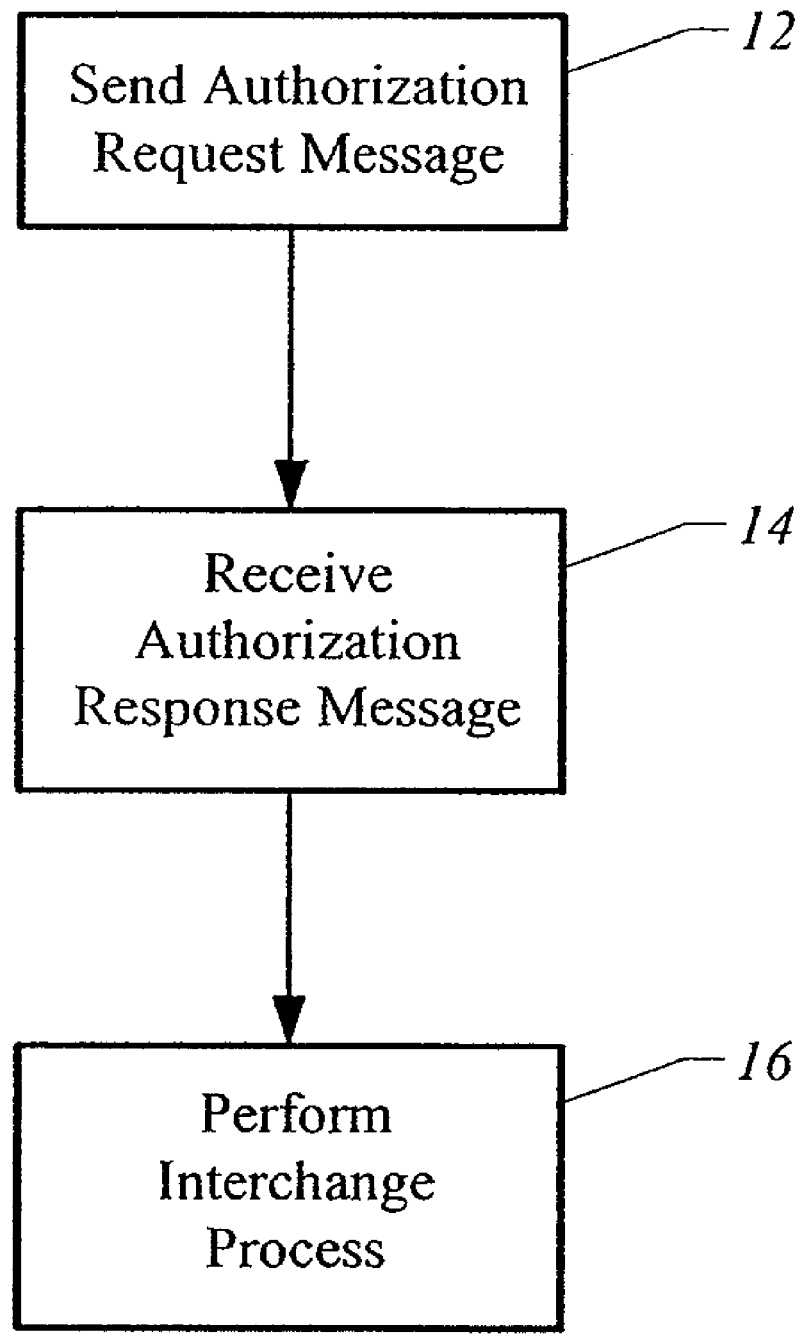
FIG. 3 shows a flowchart illustrating a method according to an embodiment of the invention.

FIG. 3 shows a flowchart according to an embodiment of the invention. For example, the embodiment may be practiced by a POS terminal (e.g., terminal 40 of FIG. 2) or other client computer device, which may be situated at the location of the oligopolistic business entity. The flowchart illustrates a method including sending an authorization request message (step 12) for a business transaction, receiving the authorization response message (step 14), and if the response message indicates that the transaction is approved, performing an interchange process (step 16). In the interchange process, the issuing bank is paid a fee for facilitating the purchase transaction. The interchange process may be performed as part of a clearing and settlement process.

Figure 4:
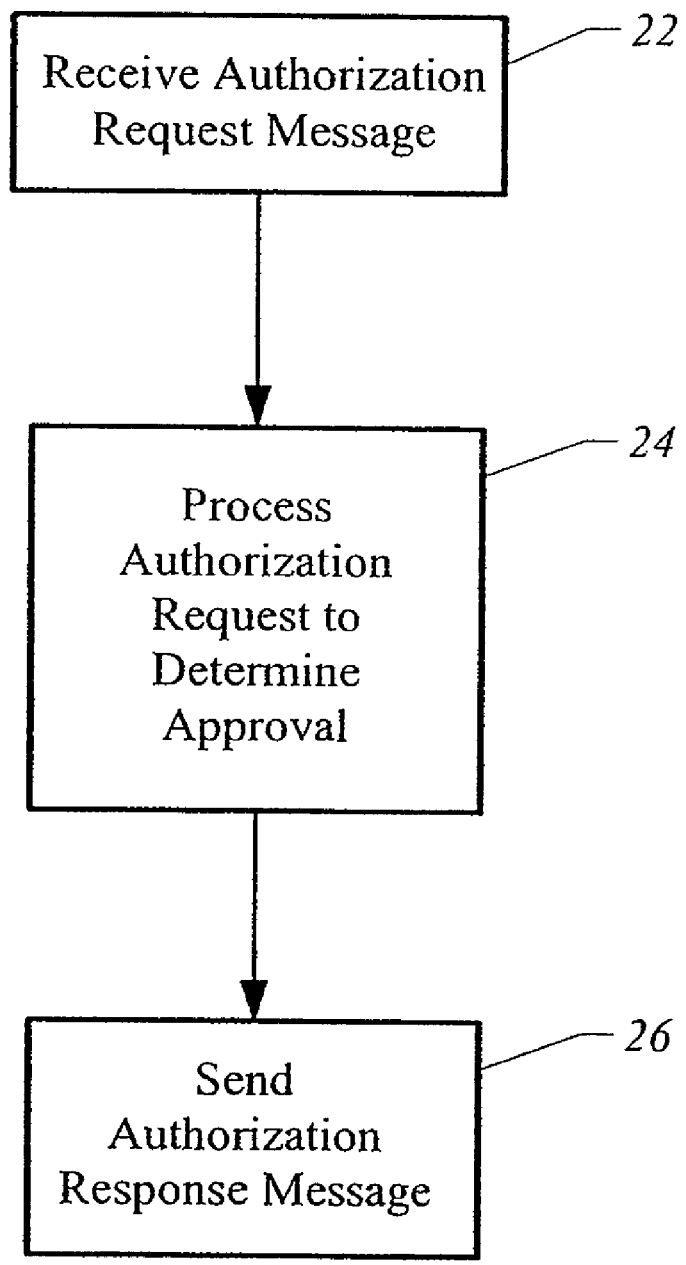
FIG. 4 shows a flowchart illustrating a method according to an embodiment of the invention.

FIG. 4 shows a flowchart according to another embodiment of the invention. For example, the embodiment may be practiced by a server computer situated at an issuer. The flowchart illustrates a method including receiving an authorization request message (step 22) for a business transaction. The authorization request message is processed to determine if the request is approved or not approved (step 24). An authorization response message is then sent stating that the request is approved or not approved (step 26).

Figure 5:
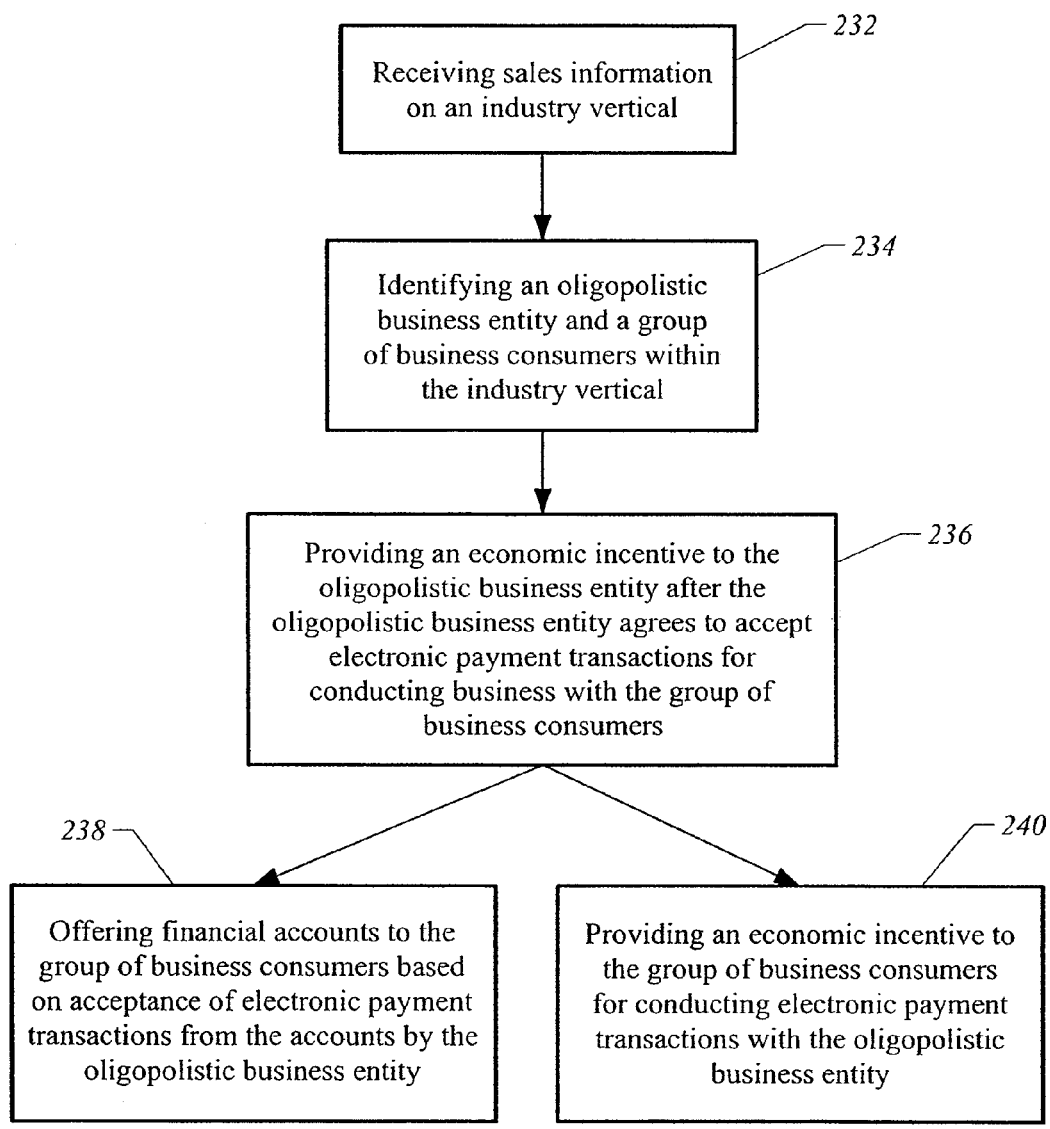
FIG. 5 shows a flowchart illustrating a method according to an embodiment of the invention.

FIG. 5 shows a flowchart according to another embodiment of the invention in which oligopolistic business entities and a group of business consumers within an industry vertical are identified and encouraged to use electronic payment methods. Sales information on the industry vertical is received (step 232). An oligopolistic business entity and a group of business consumers within the industry vertical are identified based on the sales information (step 234). An economic incentive is provided to the oligopolistic business entity after the oligopolistic business entity agrees to accept electronic payment transactions for conducting business with the group of business consumers (step 236). Payment card based financial accounts are offered to the group of business consumers, wherein the group of business consumers are informed that the oligopolistic business entity has agreed to accept the payment card based financial accounts for payment (step 238). An economic incentive is provided to the group of business consumers for conducting electronic payment transactions with the oligopolistic business entity, wherein the incentive would not be available in a transaction between the business consumer and a non-oligopolistic business entity (step 240).

The software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

As used herein, a "server computer" or "host computer" may be embodied by one or more computational apparatuses, which can service the requests of one or more client computers. Typically, a server computer or host computer is a powerful computer or cluster of computers that behave as a single computer. For example, the server computer can be a mainframe computer, a minicomputer, or a minicomputer cluster. In another example, the server computer may include one or more database servers and one or more Web servers. The server computer may service the requests of one or more client computers, and may comprise a computer readable medium.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for conducting a business transaction using a payment processing network, the method comprising:

sending, via the payment processing network, an authorization request message to an issuer, wherein the authorization request message originates from a business consumer purchasing goods or services from an oligopolistic business entity, and wherein the oligopolistic business entity is associated with one or more acquirers; wherein the oligopolistic business entity is one of a plurality of top suppliers in an industry vertical as measured by sales;

receiving an authorization response message indicating that the authorization request is approved or not approved; and providing if the authorization request is approved, an incentive associated with the business transaction via the payment processing network to the oligopolistic business entity or the business consumer for conducting the business transaction, wherein the incentive would not be available in a transaction between a non-oligopolistic business entity and the business consumer.

2. The method of claim 1, wherein the issuer and the one or more acquirers are embodied by the same entity.

3. The method of claim 1 wherein the oligopolistic business entity operates within a target industry vertical, wherein over a majority of the business consumers within the target industry vertical spend over 50% of a vertical-specific budget at fewer than ten vertical-specific suppliers.

4. The method of claim 1, wherein the plurality of top suppliers collectively sell more than a threshold percentage of the total goods or services purchased by business consumers in the industry vertical.

5. The method of claim 4, wherein the plurality of top suppliers comprises no more than five top suppliers, and wherein the threshold percentage comprises 80%.

6. The method of claim 4, wherein the industry vertical comprises a vertical supply chain supplying a particular good or service.

7. The method of claim 1, wherein the incentive comprises a transaction fee that is lower than a usual interchange fee paid by the non-oligopolistic business entity.

8. The method of claim 1, wherein the business consumer is a member of a franchise or trade association, and wherein the oligopolistic business entity is authorized by the franchise or trade association to supply goods or services to members of the franchise or trade association.

9. The method of claim 1, wherein the business transaction comprises a payment card transaction.

10. The method of claim 1, wherein the business transaction comprises an electronic settlement transaction.

11. A non-transitory computer readable medium comprising software executable by a processor, the software code comprising:

code for sending, via the payment processing network, an authorization request message to an issuer, wherein the authorization request message originates from a business consumer purchasing goods or services from an oligopolistic business entity, and wherein the oligopolistic business entity is associated with one or more acquirers; wherein the oligopolistic business entity is one of a plurality of top suppliers in an industry vertical as measured by sales;

code for receiving an authorization response message indicating that the authorization request is approved or not approved; and code for providing if the authorization request is approved, an incentive associated with the business transaction via the payment processing network to the oligopolistic business entity or the business consumer for conducting the business transaction, wherein the incentive would not be available in a transaction between a non-oligopolistic business entity and the business consumer.

12. A point of sale terminal comprising:

a processor and a computer readable medium coupled to the processor, the computer readable medium comprising software code executable by the processor, the software code comprising:

code for sending, via the payment processing network, an authorization request message to an issuer, wherein the authorization request message originates from a business consumer purchasing goods or services from an oligopolistic business entity, and wherein the oligopolistic business entity is associated with one or more acquirers; wherein the oligopolistic business entity is one of a plurality of top suppliers in an industry vertical as measured by sales;

code for receiving an authorization response message indicating that the authorization request is approved or not approved; and code for providing if the authorization request is approved, an incentive associated with the business transaction via the payment processing network to the oligopolistic business entity or the business consumer for conducting the business transaction, wherein the incentive would not be available in a transaction between a non-oligopolistic business entity and the business consumer.

13. A payment processing network comprising: a server computer and a computer readable medium coupled to the server computer, the computer readable medium comprising software code executable by the server computer, the software code comprising code for:

communicating an authorization request message to an issuer, wherein the authorization request message originates from a business transaction in which a business consumer purchases goods or services from an oligopolistic business entity, wherein the oligopolistic business entity is associated an acquirer; wherein the oligopolistic business entity is one of a plurality of top suppliers in an industry vertical as measured by sales;

communicating an authorization response message from the issuer to the acquirer indicating that the authorization request is approved or not approved; and providing, if the authorization request is approved, an incentive associated with the business transaction to the oligopolistic business entity or the business consumer for conducting the business transaction, wherein the incentive would not be available in a transaction between a non-oligopolistic business entity and the business consumer.

14. The method of claim 13 wherein the incentive is an interchange fee that is lower than that which is charged to an individual consumer.

15. The method of claim 13 wherein the oligopolistic business entity or the business consumer is one of a restaurant industry, a gas station industry, or an electronics retail industry.

16. The method of claim 13 wherein the authorization request message is received from a portable consumer device associated with the oligopolistic entity.

* * * * *